Figure 1:
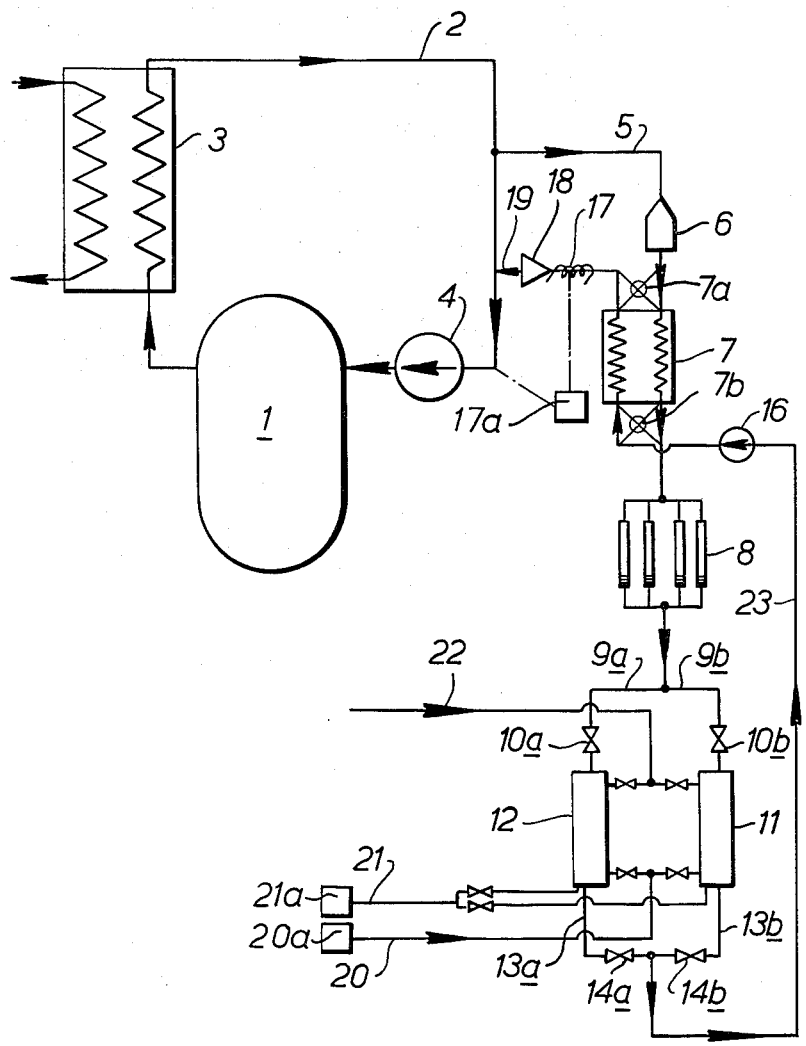

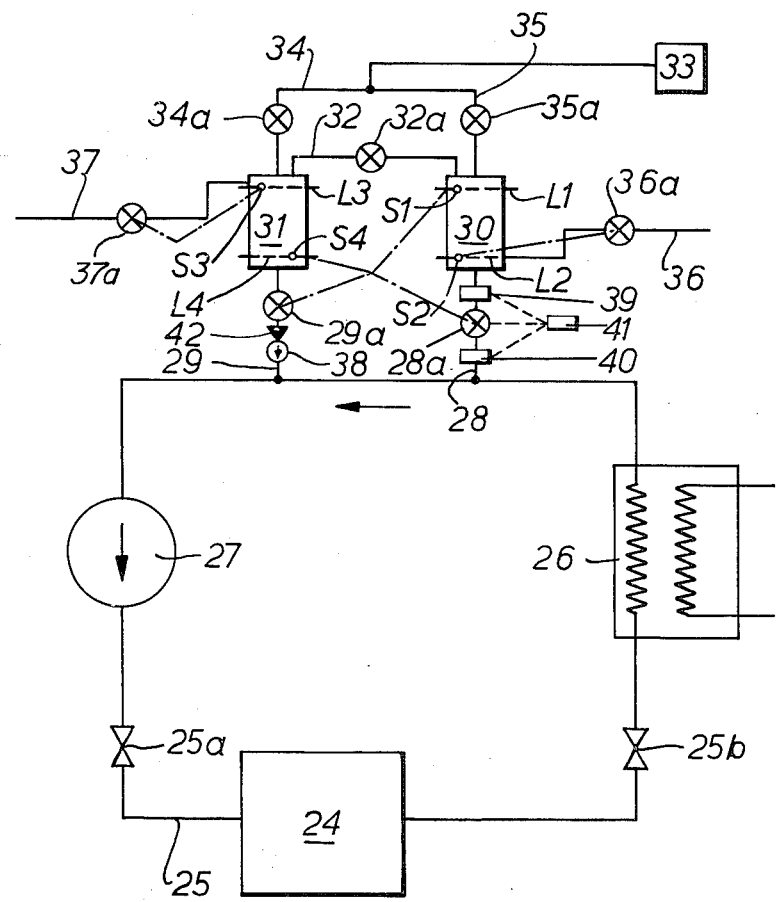

United States Patent Office 3,239,423
Patented Mar. 8, 1966

3,239,423
NUCLEAR REACTOR PLANT WITH MEANS
TO VARY COMPOSITION OF COOLANT-
MODERATOR
Alan Alfred Cooper, Dorchester, Dorset, England, assignor, by mesne assignments, to Societe Anglo-Belge Vulcain SA, Brussels, Belgium
Filed Jan. 28, 1963, Ser. No. 254,332
Claims priority, application Great Britain, Feb. 1, 1962, 3,975/62; Feb. 7, 1962, 4,794/62
2 Claims. (Cl. 176—42)

This invention relates to a nuclear reactor plant having a liquid coolant and/or moderator and in which it is a requirement that a proportion of the liquid in the circuit be replaced, or that adjustments to the composition of the liquid be made.

One such nuclear reactor, in which this requirement arises, is a pressurised water reactor in which part of the nuclear control is by the application of the so-called spectral shift principle, that is changing the properties of the moderator so that the spectrum of neutron energies in the reactor shifts in the direction to give a desired reactivity change.

The application of this principle to pressurised water reactors, as has been purposed hitherto, involves employing as an initial charge of coolant/moderator a mixture of heavy water and light water, the composition of which may be progressively altered so as to alter the nuclear reactivity, the total quantity of liquid in the closed circuit flow at all times remaining constant.

Difficulties arise, however, in providing a suitable extraction- (or subtraction-) injection cycle of operation for a closed circuit liquid flow operating under pressure and at high temperature, if the possibility of "accident" conditions are to be minimised. Accident conditions could arise, for example, if an uncontrolled excess quantity of light water were allowed to enter the reactor coolant/moderator flow at a stage in core life when the excess reactivity was being controlled by the heavy water constituent of the coolant/moderator; or with the reactor designed for operation with a negative temperature coefficient of reactivity, the liquid was introduced into the circuit at a temperature lower than that of the main coolant. Moreover an accident could occur if the addition and subtraction of moderator were effected in a manner such that a pressure change in either a positive or negative sense occurred in the closed circuit—for example by the added volume of liquid being unequal to the subtracted volume.

According to the invention a nuclear reactor plant having a closed circuit for pressurised coolant/moderator liquid including two compartments one of which is connected to inject an injection liquid or additive into the circuit suitable for effecting a difference in the moderating characteristic of the liquid in the circuit whilst an equal amount of liquid is subtracted from the circuit and means for ensuring contemporaneous injection and subtraction.

Thus in one aspect the invention may comprise a nuclear reactor plant employing a pressurised coolant/moderator liquid and adapted for control by spectral shift by the inclusion of means for causing a coolant/moderator liquid flow through any one of two or more similar chambers whilst the others are isolated from the circuit flow and are charged with a replacement or additive liquid and means operative on occasion to subtract coolant/moderator in said one or more chambers and contemporaneously diverting the coolant/moderator liquid in the circuit to flow through other chambers previously charged with a replacement liquid.

Preferably the chambers are located in a subsidiary loop (such as a purification loop) which may be operated at a temperature and pressure lower than that of main circuit, use being made of an available pressure-temperature trimming plant to adjust these conditions of the replacement liquid before it is returned to the main circuit flow.

In order that the invention may be more fully understood alternative embodiments thereof will now be described with reference to the accompanying drawings which show in FIG. 1 a pressurised water reactor circuit arranged for operation with a closed coolant/moderator circuit, the coolant/moderator composed of a mixture of light water and heavy water, and adapted for spectral shift control; and FIG. 2 an alternative form of circuit.

In FIG. 1, a pressurised water nuclear reactor 1 has a main, closed coolant/moderator circuit 2 including a heat exchanger 3 through which the coolant/moderator is circulated in the direction shown by pump 4. In order to preserve the purity of the coolant/moderator a subsidiary circuit is connected by a pipe 5 to the main circuit, including a depressuriser 6, a heat exchanger 7, having inlet and outlet valves 7a, 7b, ion exchange columns and filters 8, connected in series through which a proportion of the coolant/moderator is passed. A pump 16 and trimming heater 17 are provided to adjust the pressure and temperature of the purified coolant/moderator before it is returned to the main circuit, by way of a non-return valve 18 and pipe 19.

The temperature of the main circuit coolant is sensed by a controller 17a which in turn controls the output of the heater to maintain the temperature of the fluid in the pipe 19 equal to that in the main circuit. For operation with spectral shift control, means are required for extracting, from time to time, a predetermined quantity of the coolant/moderator from the circuit flow, and for replacing it by an equal quantity of diluent, which will have the effect of modifying the moderating characteristic of the fluid, but at the same time keeping the quantity of coolant/moderator in the main circuit constant.

To this end, in the scheme shown, the purified coolant/moderator mixture, from the outlet of the filters 8, is made to flow through either of the two outlet branches 9a or 9b, according to the setting of valves 10a and 10b, to enter the appropriate chamber 11 or 12, and thence through the appropriate outlet pipe 13a or 13b in which are situated valves 14a and 14b. Also associated with the chambers 11 and 12 are pipe connections 20, 21 connected to an injection liquid supply 20a and a drain 21a respectively, for the purposes of filling and draining the chambers 11 and 12, and pipe 22 for the introduction or venting of a suitable gas blanket into a selected one of the chambers 11, 12. Pipe 23 connects the down-stream side of valves 14a, 14b with the inlet side of pump 16.

During normal operation of the reactor coolant/moderator circuit, a proportion of the reactor coolant/moderator is made to flow continuously through the circuit described above, by way of one or other of the chambers 11 or 12. Thus, if chamber 12 is selected to serve as the injection chamber then valves 10a and 14a are closed and valves 10b and 14b are opened. Coolant/moderator liquid in the purification loop then flows through chamber 11. Under these conditions, chamber 12 having been drained of purified coolant/moderator substracted in a previous cycle is filled by way of pipe 20 with the liquid which it is intended to introduce into the main circuit 2, whilst on inert gas blanket in the chamber 12 is allowed to vent via pipe 22.

The temperature and pressure of this fluid may now, if it has not already been accomplished, be suitably adjusted to match that of the flow through chamber 11.

Valves 10b and 14b are now closed, thereby isolating purified coolant/moderator liquid in chamber 11 and valves 10a and 14a opened, thus diverting the flow through chamber 12 and introducing the charge fluid into the flow stream whence it is carried into the main circuit 2. Chamber 11 is now drained via outlet 16 and an inert gas supplied to the chamber via pipe connection 20. The chamber 11 is now ready for charging with injection liquid.

The injection/extraction cycle may then be repeated as required, using chamber 12 for extraction, and chamber 11 for injection, and so on.

It will be appreciated that by arranging the injection/extraction process to be effected at a point in the circuit at which the pressure and temperature is low, and through a system of fixed capacity, the possibility of a cold water or light water accident is minimised. Further, at any time during the injection cycle, the position of valves 10a and 10b, 14a and 14b may be reversed, thus cutting off the supply of diluent and reverting the flow to the other part of the circuit, which at this time still contains the original coolant/moderator mixture.

In FIG. 2 a nuclear reactor 24 is cooled and moderated by pressurised water circulated in a main, closed circuit 25 including a heat exchanger 26 and a pump 27. Valves 25a, 25b are provided on the inlet and outlet sides of the reactor 24. The pressurised water coolant/moderator may comprise a mixture of light and heavy water and the reactor may be adapted for control by varying the proportions of these constituents according to the reactivity of the reactor core. Alternatively, it may be required to inject a soluble poison into the closed circuit in order to effect emergency reactor shut-down. In either event, in order to maintain the pressure and the total quantity of liquid constant in the main circuit, it is necessary to extract an equivalent quantity of liquid as another liquid is injected simultaneously. In the following, the liquid added is referred to as the injection liquid whilst the liquid withdrawn is referred to as the extraction liquid.

Upstream and downstream tappings to the closed circuit 25 are arranged to communicate via pipes 28 and 29 respectively with two chambers 30 and 31 under the control of valves 28a and 29a. The chambers 30 and 31 can be made to intercommunicate by way of a conduit 32 having a valve 32a. A pressure gas source 33 can be put in communication with each of the chambers 30 or 31 through pipes 34, 35 having valves 34a, 35a. The upstream chamber 30 has an outlet connection 36 for removal therefrom of the extraction liquid under control of a valve 36a whilst the downstream chamber 31 has an inlet connection 37 for charging that chamber with injection liquid.

Chamber 30 has one valve interlocks, one of which includes high and low level limit switches S1 and S2 and chamber 31 has similar switches S3 and S4. Switches S1 and S4 are arranged to close valves 28a, 29a when the respective high level L1 in chamber 30 and low level L4 in chamber 31 is reached. The switches S2 and S3 are actuated when liquid in the chambers reaches the respective levels L2 and L3 and effect closure of valves 36a and 37a respectively.

A second interlock system for the valves 28a, 29a is designed to prevent liquid moderator from passing out of the main circuit into compartments 30, 31 if the valves are opened inadvertently whilst there was a pressure drop between the circuit and the compartments in the appropriate sense. Such an interlock for the valve 28a is provided by pressure sensors 39, 40 in the pipe 28 on each side of the valve 28a, the outputs of which are fed to a controller 41 for the valve 28a. The controller 41 prevents the valve from opening unless the pressures on either side of the valve 28a are equal or nearly equal.

For the tapping pipe 29, non-return valve 42 is sufficient to prohibit outflow of moderator from the circuit.

Under normal reactor operating conditions both valves 28a, 29a are maintained closed and pressurised coolant/moderator liquid is circulated in the circuit, by the pump 27 passing through the reactor 24 and heat exchanger 26. The downstream chamber 31 is charged with the requisite amount of injection liquid by opening valve 37a and supplying the liquid through the pipe 37 to the level L3 when the limit switch S3 operates to close the valve 37a.

The valves 34a, 35a and 32a are next opened and the chamber 30, pipe 32 and remaining volume of chamber 31 are then charged with such a volume of inert gas that a pressure corresponding to a pressure in main circuit 25 the gas volume is equal to the volume of replacement liquid by pumping in an inert gas from source 33 through pipes 34 and 35, valve 36a being closed during the operation. The valves 34a, 35a are then closed. Chamber 30 contains liquid to the level L2 from the previous cycle and together with the valve 28a prevents gas entering the main circuit.

When injection of the liquid in the chamber 31 into the circuit 25 and the simultaneous extraction of a corresponding quantity of liquid from the circuit is required, both the valves 28a, 29a are opened and, provided there is a pressure drop existing, or created, between the upstream and downstream tapping points on the main circuit, then the coolant/moderator liquid will enter the extraction chamber 30 via pipe 28 so displacing the gas therein through the conduit 32. The resultant pressure rise in the chamber 31 will effect the injection of the liquid contained therein through the pipe 29 into the circuit 25. The liquid level in chamber 30 rises and that in chamber 31 falls so operating limit switches S1 and S4, as the levels reach L1 and L4 respectively. Valves 29a and 28a close in response to this switching action. The liquid trapped in the chamber 30 is then pumped to storage via pipe 36, with valve 36a open.

The system so described may also serve the dual function of pressurising unit to pressurise the main circuit, since at any time, one or more of the chambers may be connected to the main circuit and the gas blanket adjusted in pressure.

In the example shown, an appropriate pressure difference can be introduced between the tapping points by operation of a pump 38. Alternatively, however, the pressure drop can be formed by either inserting a valve in the main circuit or by taking the tappings from points of the main circuit across an existing pressure drop in the circuit such as that created by valves 25a, 25b, reactor 24 or heat exchanger 26.

I claim:

1. A nuclear reactor plant comprising a reactor, a pressurised coolant/moderator liquid for the reactor, the composition of the liquid being variable to adjust the reactivity of the reactor, a closed circuit for circulation of the pressurised liquid through the reactor, an injection chamber, means for charging the injection chamber with injection liquid, an extraction chamber of similar capacity to the injection chamber, means for withdrawing extraction liquid from the extraction chamber, a duct interconnecting the upper ends of the chambers, means to pressurise the chambers with an inert gas, and connections between the chambers and the closed circuit such that extraction of liquid from the closed circuit into the extraction chamber is accompanied by displacement of gas from the extraction chamber to the injection chamber and corresponding injection of liquid from the injection chamber into the closed circuit.

2. A nuclear reactor plant comprising a reactor, a pressurised coolant/moderator liquid for the reactor, the composition of the liquid being variable to adjust the reactivity of the reactor, a closed circuit for circulation of the pressurised liquid through the reactor, an injection chamber, means for charging the injection chamber with injection liquid, an extraction chamber of similar capacity to the injection chamber, means for withdrawing extraction liquid from the extraction chamber, a duct interconnecting the upper ends of the chambers, a throttle in the duct, means to pressurise the chambers with an inert gas, a first connection between the extraction chamber and the closed circuit and a second connection between the injection chamber and the closed circuit downstream of the first connection such that the injection chamber and the extraction chamber comprise a subsidiary loop parallel to the closed circuit, the fluid impedance of this loop being adjustable by means of the throttle.

References Cited by the Examiner

UNITED STATES PATENTS 3,081,246  3/1963  Edlund _____ 176—18

FOREIGN PATENTS 749,064  5/1956  Great Britain.

CARL D. QUARFORTH, *Primary Examiner.*

REUBEN EPSTEIN, *Examiner.*